US009913433B2

(12) United States Patent
Singh et al.

(10) Patent No.: US 9,913,433 B2
(45) Date of Patent: Mar. 13, 2018

(54) SELECTABLE KNIFE TRAY ARRANGEMENT

(71) Applicant: CNH Industrial America LLC, New Holland, PA (US)

(72) Inventors: Chandrashekhar Singh, Lancaster, PA (US); John R. McClure, New Holland, PA (US); Dhananjay Wagh, Vadodara (IN); Kushan Mehta, Ahmedabad (IN)

(73) Assignee: CNH Industrial America LLC, New Holland, PA (US)

( * ) Notice: Subject to any disclaimer, the term of this patent is extended or adjusted under 35 U.S.C. 154(b) by 506 days.

(21) Appl. No.: 14/611,096

(22) Filed: Jan. 30, 2015

(65) Prior Publication Data
US 2016/0219792 A1 Aug. 4, 2016

(51) Int. Cl.
*A01F 29/06* (2006.01)
*A01F 29/04* (2006.01)
*A01D 90/04* (2006.01)
*A01F 29/09* (2010.01)
*A01F 15/10* (2006.01)

(52) U.S. Cl.
CPC ........... *A01F 29/095* (2013.01); *A01D 90/04* (2013.01); *A01F 29/04* (2013.01); *A01F 2015/107* (2013.01); *A01F 2015/108* (2013.01)

(58) Field of Classification Search
CPC ........ A01F 29/095; A01F 29/04; A01F 29/10; A01F 2015/107; A01F 2015/108; A01D 90/04
USPC ...................... 56/341, 131, 364; 30/245, 240
See application file for complete search history.

(56) References Cited

U.S. PATENT DOCUMENTS

| 5,433,067 | A | * | 7/1995 | Smith | A01F 15/0715 100/88 |
| 5,802,825 | A | | 9/1998 | Chow et al. | |
| 5,974,776 | A | | 11/1999 | Prellwitz | |
| 6,050,510 | A | | 4/2000 | Bonnewitz | |
| 6,128,995 | A | * | 10/2000 | Geng | A01D 90/04 56/341 |
| 6,594,983 | B1 | | 7/2003 | Krone et al. | |
| 6,595,123 | B2 | | 7/2003 | Schrag et al. | |
| 6,912,835 | B1 | | 7/2005 | Chabassier | |
| 7,484,350 | B2 | * | 2/2009 | Benes | A01F 12/40 56/504 |
| 7,770,371 | B2 | | 8/2010 | Lucot et al. | |
| 8,920,227 | B2 | * | 12/2014 | Murray | A01F 29/095 460/112 |
| 2013/0316770 | A1 | | 11/2013 | Haycocks | |
| 2016/0057937 | A1 | * | 3/2016 | McClure | A01F 15/08 56/341 |

FOREIGN PATENT DOCUMENTS

EP 659332 A1 6/1995

* cited by examiner

*Primary Examiner* — John Weiss
(74) *Attorney, Agent, or Firm* — Patrick M. Sheldrake

(57) ABSTRACT

A cutting assembly is described that comprises two oppositely facing sidewalls and two loading systems, each loading system comprising a transverse member that extends between and through the sidewalls, and two trays of knives. Rotation of a transverse member causes the associated tray of knives to move between a loaded and an unloaded position, wherein the loaded position the knives protrude into a crop collection channel of a harvester for the cutting of crop material.

26 Claims, 17 Drawing Sheets

SELECTABLE KNIFE TRAY ARRANGEMENT

TECHNOLOGY FIELD

The present disclosure relates generally to a crop feeding system in a harvester, particularly to connections that allow for the proper placement of multiple counter knife trays in a bottom floor assembly.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and into a crop feeding channel where the material can be further cut before being introduced into a bale-forming chamber. Traditionally, a series of knife blades, known as counter knives, protrudes into the crop feeding channel to assist in the cutting of the crop material. Such knives are mounted for individual release or tripping against a biasing force so as to protect the individual blades from being damaged from obstacles or crop which produces high loads. Additionally, many systems provide a way of selecting all, none, or various numbers of the available knives for operation so as to vary the amount the crop is reduced by the active knives.

DE 43 02 199 discloses one way of selecting the number of active cutting knives. However, this cutting device requires each knife to be individually locked out of operation, which is time consuming and is difficult to achieve in the cramped environment where the cutting device is mounted.

U.S. Pat. No. 6,050,510 discloses a way of selecting the number of active cutting knives wherein a plurality of knives can be locked out of operation according to a pre-selected arrangement by pivoting a blocking rod into a desired location and securing it there for blocking a pre-selected arrangement of knives. While this device does permit multiple knives to be blocked out at the same time, the mechanism for achieving this operation is relatively complex and does not act in concert with the mechanism that allows the knives to form a compact arrangement.

Additional systems, such as U.S. Pat. Nos. 6,394,893, 6,594,983, 6,912,835, and 7,770,371, disclose complex mechanisms for selecting the number of active cutting knives, either by hydraulically controlling each individual knife, or by the rotation of a selection system that activates a certain number of the knives. While such systems do permit the selection of active cutting knives while maintaining a relatively compact arrangement, knives not actively in use are still stored in the machine during operation.

The instant application provides a crop collection system that allows for two trays of cutting knives, each of which can be independently positioned into loaded and unloaded positions. This selectable knife tray arrangement is compact, easy to access, works in concert with the rest of the crop collection system, and allows knives not in active use to be removed from the harvester for maintenance or storage.

SUMMARY

The disclosure relates to a cutting device comprising: a first and a second oppositely facing sidewalls, wherein at least one of the oppositely facing sidewalls comprises at least a first slot; and at least a first loading system comprising: at least a first tray, positioned between the two oppositely facing sidewalls and movable in at least a first and a second position, the at least first tray comprising one or a plurality of knives and at least one cross member through which or upon one or a plurality of knives rest; and at least a first transverse member, positioned between and extending through the two oppositely facing sidewalls, rotatable around a first linear axis transverse to the sidewalls and operably linked to at least a first connecting unit positioned at least partially within the at least first slot and mechanically linked to the at least first tray such that rotation of the first transverse member causes linear movement of the at least first tray; such that the at least first tray moves from the at least first position to the at least second position; wherein the first position of the at least first tray is an unloaded position and the second position of the at least first tray is a loaded position.

In some embodiments, the at least first connecting unit comprises: at least a first bracket mechanically linked to the at least one cross member of the at least first tray; and a cam fastened to the at least first bracket, positioned at least partially within the at least first slot, and operably linked to the at least first transverse member.

In some embodiments, the cutting device further comprises at least a second slot in at least one of the two oppositely facing sidewalls; and a second loading system comprising: at least a second tray, positioned between the two oppositely facing sidewalls and movable in at least a first and a second position, the at least second tray comprising at least one cross member through which or upon one or a plurality of knives rest; and at least a second transverse member, positioned between and extending through the two oppositely facing sidewalls, rotatable around a second linear axis transverse to the sidewalls and operably linked to at least a second connecting unit positioned at least partially within the second slot and mechanically linked to the at least second tray such that rotation of the at least second transverse member causes linear movement of the at least second tray; such that the at least second tray moves from the at least first position to the at least second position; wherein the first position of the at least second tray is an unloaded position and the second position of the at least second tray is a loaded position.

In some embodiments, the at least second connecting unit comprises: at least a first bracket mechanically linked to the at least one cross member of the at least second tray and mechanically linked to the second transverse member; and a cam fastened to the bracket, positioned at least partially with the at least second slot.

In some embodiments, the first and second loading systems are independently moveable, such that the cutting device operates when both the first and second loading systems are in an unloaded positions, when the first loading system is in a loaded position while the second loading system is in an unloaded position, when the second loading system is in a loaded position while the first loading system is in an unloaded position, or when the first and second loading system are both in a loaded position.

In some embodiments, the at least first transverse member is operably linked to a lever, hydraulic cylinder, or movable device capable of driving rotation of the at least first transverse member around the first linear axis.

In some embodiments, the at least first transverse member is operably linked to a first hydraulic cylinder by at least a first non-coaxial element that is capable of rotation around and extends radially from the first linear axis, such that extension or contraction of the first hydraulic cylinder causes rotational movement of the at least first non-coaxial element and the at least first transverse member around the first linear axis.

In some embodiments, the at least first transverse member is mechanically linked to a second non-coaxial element that is capable of rotation around and extends radially from the first linear axis, such that rotation of the at least first transverse member causes rotation of the second non-coaxial element; and wherein the second non-coaxial element is operably connected to the at least first connecting unit by at least a first linking member.

In some embodiments, the extension or contraction of the first hydraulic cylinder causes movement of the at least first connecting unit, the at least first linking member, the at least second non-coaxial element, the at least first transverse member, and the at least first non-coaxial element by the first hydraulic cylinder, allowing the at least first tray to move between the at least first and second positions.

In some embodiments, the at least first transverse member is mechanically linked to a third non-coaxial element that is capable of rotation around and extends transversely from the first linear axis, such that rotation of the at least first transverse member causes rotation of the third non-coaxial element; wherein the third non-coaxial element is operably connected to at least a third connecting unit by at least a second linking member.

In some embodiments, the first hydraulic cylinder, the at least first non-coaxial element, the at least second non-coaxial element and the at least first linking member are positioned on the exterior surface of one of the two oppositely facing sidewalls and the at least third non-coaxial element and the at least second linking member are positioned on the exterior surface of the other oppositely facing sidewall.

In some embodiments, the first loading system is configured for loading knives within a crop channel between a rotary cutter and a drop floor unit.

In some embodiments, the at least second transverse member is operably linked to a lever, hydraulic cylinder, or movable device capable of driving rotation of the at least second transverse member around the second linear axis.

In some embodiments, the at least second transverse member is operably linked to a second hydraulic cylinder by at least a fourth non-coaxial element that is capable of rotation around and extends transversely from the second linear axis, such that extension or contraction of the second hydraulic cylinder causes rotational movement of the at least fourth non-coaxial element and the at least second transverse member around the second linear axis.

In some embodiments, the at least second transverse member is mechanically linked to a fifth non-coaxial element that is capable of rotation around and extends transversely from the second linear axis, such that rotation of the at least second transverse member causes rotation of the fifth non-coaxial element; and wherein the fifth non-coaxial element is operably connected to the at least third connecting unit by at least a third linking member.

In some embodiments, the extension or contraction of the second hydraulic cylinder causes movement of the at least third connecting unit, the at least third linking member, the at least fifth non-coaxial element, the at least second transverse member, and the at least fourth non-coaxial element, allowing the at least second tray to move between the at least first and second positions.

In some embodiments, the at least second transverse member is mechanically linked to a sixth non-coaxial element that is capable of rotation around and extends transversely from the second linear axis, such that rotation of the at least second transverse member causes rotation of the sixth non-coaxial element; wherein the sixth non-coaxial element is operably connected to at least a fourth connecting unit by at least a fourth linking member.

In some embodiments, the second hydraulic cylinder and the at least fourth non-coaxial element are positioned on the exterior surface of one of the two oppositely facing sidewalls; wherein the fifth non-coaxial element and the third linking member are positioned on the interior surface of the same sidewall; and wherein the sixth non-coaxial element and the fourth linking member are positioned on the interior surface of the other oppositely facing sidewall.

In some embodiments, the first and second loading systems are configured for loading knives within a crop channel between a rotary cutter and a drop floor unit, such that, in a loaded position, the knives of the first loading system do not interfere with the knives of the second loading system.

In some embodiments, the knives of the first loading system comprise a plurality of arrangements within the at least first tray and the knives of the second loading system comprise a plurality of arrangements with the at least second tray; wherein the plurality of arrangements for each tray comprises an amount of knives from about zero to about thirteen; and wherein the total number of knives comprises an amount of knives from about zero to about twenty-six.

The disclosure also relates to a harvester comprising a cutting device comprising: a first and a second oppositely facing sidewalls, wherein at least one of the oppositely facing sidewalls comprises at least a first slot; and at least a first loading system comprising: at least a first tray, positioned between the two oppositely facing sidewalls and movable in at least a first and a second position, the at least first tray comprising one or a plurality of knives and at least one cross member through which or upon one or a plurality of knives rest; and at least a first transverse member, positioned between and extending through the two oppositely facing sidewalls, rotatable around a first linear axis transverse to the sidewalls and operably linked to at least a first connecting unit positioned at least partially within the at least first slot and mechanically linked to the at least first tray such that rotation of the first transverse member causes linear movement of the at least first tray; such that the at least first tray moves from the at least first position to the at least second position; wherein the first position of the at least first tray is an unloaded position and the second position of the at least first tray is a loaded position.

In some embodiments, the harvester further comprises: at least a second slot in at least one of the two oppositely facing sidewalls; and a second loading system comprising: at least a second tray, positioned between the two oppositely facing sidewalls and movable in at least a first and a second position, the at least second tray comprising at least one cross member through which or upon one or a plurality of knives rest; and at least a second transverse member, positioned between and extending through the two oppositely facing sidewalls, rotatable around a second linear axis transverse to the sidewalls and operably linked to at least a second connecting unit positioned at least partially within the second slot and mechanically linked to the at least second tray such that rotation of the at least second transverse member causes linear movement of the at least second tray; such that the at least second tray moves from the at least first position to the at least second position; wherein the first position of the at least second tray is an unloaded position and the second position of the at least second tray is a loaded position.

In some embodiments, the first and second loading systems are independently moveable, such that the cutting device operates when both the first and second loading systems are in an unloaded positions, when the first loading system is in a loaded position while the second loading system is in an unloaded position, when the second loading system is in a loaded position while the first loading system is in an unloaded position, or when the first and second loading system are both in a loaded position.

In some embodiments, the first and second loading systems are configured for loading knives within a crop channel between a rotary cutter and a drop floor unit, such that, in a loaded position, the knives of the first loading system do not interfere with the knives of the second loading system.

In some embodiments, the knives of the first loading system comprise a plurality of arrangements within the at least first tray and the knives of the second loading system comprise a plurality of arrangements with the at least second tray; wherein the plurality of arrangements for each tray comprises an amount of knives from about zero to about thirteen; and wherein the total number of knives comprises an amount of knives from about zero to about twenty-six.

The disclosure also relates to a method of moving one or a plurality of knives within a crop channel of a harvester, comprising: a) extension of at least one hydraulic cylinder; b) rotation of at least one transverse member positioned between a first and a second oppositely facing sidewalls; c) movement of at least one connecting unit along at least one slot in at least one of the oppositely facing sidewalls, said movement in the direction towards the crop channel; d) movement of at least one tray comprising one or a plurality of knives toward the crop channel; and e) entry of the one or a plurality of knives within the crop channel.

DETAILED DESCRIPTION OF THE DISCLOSURE

Figure 1:
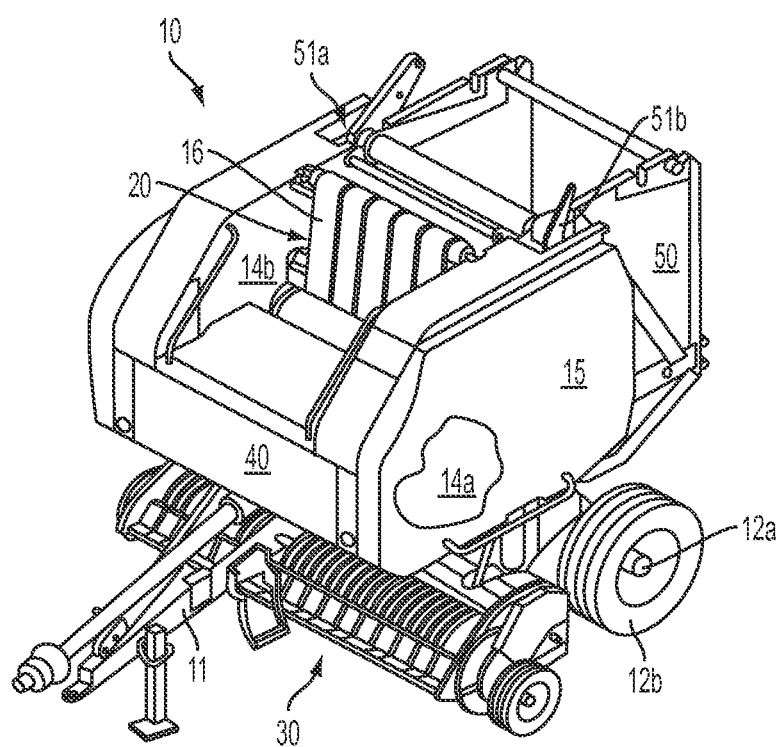
FIG. 1 depicts a static image of a baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. in some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber.

In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "cutting implement" as used herein is defined as a device involved with the cutting of crop material, including one or a plurality of knives, blades, teeth, gears, grinders, sissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural balers, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to a harvester assembly comprising a feeder assembly, a bottom floor assembly, and a crop collection channel positioned therebetween, designed to facilitate the transfer and cutting of crop material from a pickup assembly that lifts the crop material off of the ground, to a bale chamber or other crop press that packages the crop material. As crop material passes through the crop collection channel, it is cut by a series of knives that protrude through the bottom floor assembly and into the crop collection channel. The present disclosure relates to some embodiments comprising a total of twenty six knives, arranged in two sets of thirteen, that are equally spaced from each other across the width of the crop collection channel. An operator has the option of running the harvester with all twenty six knives present in the channel, only one set of knives present in the channel, or no knives present in the channel. The present disclosure details the loading mechanisms for moving the two sets of knives from an unloaded to a loaded position, and vice versa, wherein a set of knives is positioned in the crop collection channel in the loaded position, and is not positioned in the crop collection channel in the unloaded position.

In some embodiments, the number of knives in each set and the total number of knives can vary. In some embodiments, a set of knives comprises from about 0 to about 13 knives. In some embodiments, a set of knives comprises from about 1 to about 13 knives. In some embodiments, a set of knives comprises from about 2 to about 13 knives. In some embodiments, a set of knives comprises from about 3 to about 13 knives. In some embodiments, a set of knives comprises from about 4 to about 13 knives. In some embodiments, a set of knives comprises from about 5 to about 13 knives. In some embodiments, a set of knives comprises from about 6 to about 13 knives. In some embodiments, a set of knives comprises from about 7 to about 13 knives. In some embodiments, a set of knives comprises from about 8 to about 13 knives. In some embodiments, a set of knives comprises from about 9 to about 13 knives. In some embodiments, a set of knives comprises from about 10 to about 13 knives. In some embodiments, a set of knives comprises from about 11 to about 13 knives. In some embodiments, a set of knives comprises from about 12 to about 13 knives. In some embodiments, a set of knives comprises from about 0 to about 12 knives. In some embodiments, a set of knives comprises from about 0 to about 11 knives. In some embodiments, a set of knives comprises from about 0 to about 10 knives. In some embodiments, a set of knives comprises from about 0 to about 9 knives. In some embodiments, a set of knives comprises from about 0 to about 8 knives. In some embodiments, a set of knives comprises from about 0 to about 7 knives. In some embodiments, a set of knives comprises from about 0 to about 6 knives. In some embodiments, a set of knives comprises from about 0 to about 5 knives. In some embodiments, a set of knives comprises from about 0 to about 4 knives. In some embodiments, a set of knives comprises from about 0 to about 3 knives. In some embodiments, a set of knives comprises from about 0 to about 2 knives. In some embodiments, a set of knives comprises from about 0 to about 1 knives.

In some embodiments, the present disclosure relates to a cutting device comprising two oppositely facing sidewalls and two loading systems, one loading system for each set of thirteen knives. Each loading system comprises a tray positioned between the two sidewalls, with the tray comprising a cross member through which or upon the knife units rest; a transverse member positioned between and extending through the sidewalls which is rotatable around a linear axis, a series of co-axial elements that mechanically connect the transverse member to the related tray and cross member, and a hydraulic cylinder or other device that is capable of moving the other elements of the loading system such that the related knife tray is moved from an unloaded to a loaded position, or vice versa. In some embodiments, the two loading systems are capable of independent movement, such that both, one, or none of the knife trays may be in a loaded position at a given point in time.

In some embodiments, the present disclosure relates to a cutting device comprising at least one loading system, wherein the loading system comprises a transverse member and at least one connecting unit which is operably linked to a knife tray. In some embodiments, rotational movement of the transverse member is translated into linear movement of the at least one connecting unit operably linked knife tray. In some embodiments, the linear movement of the knife tray causes one or a plurality of individual knife units to move into a loaded or unloaded position. In some embodiments, the at least one connecting unit comprises a bracket and a cam, wherein the bracket is operably linked to a knife tray and the cam is located in a slot in a sidewall. In some embodiments, the movement of the cam along the slot defines the linear movement of a knife tray operably linked to the at least one connecting unit.

In some embodiments, the cutting device is operably connected to the bottom floor assembly and does not maintain a static position, movable instead with the bottom floor assembly if said assembly is capable of independent movement from the rest of the harvester. For example, in some embodiments, if the bottom floor assembly is designed for movement to enlarge the crop collection channel in the event a crop plug or blockage is present, the bottom floor assembly and the cutting device may pivot in a direction downward in an attempt to remove the blockage. In some embodiments, the knives may be independently movable in the linear direction in the loaded position. In some embodiments, the knives may be independently movable within a set of knives.

Referring to FIG. 1, a generally well-known round baler 10 is shown to include a main frame terminating forwardly in a tongue 11 and rearward slightly beyond a transverse axle 12*a* to which a pair of wheels 12*b* (only one shown) is mounted, thus forming a wheel supported main frame (not shown in detail). The main frame supports a series of belts 16 and floor rolls (not shown), which together with a first sidewall 14*a* (shown in the breakout) behind and generally parallel to cover panel 15 and a second sidewall 14*b*, collectively forming a bale-forming chamber 20. Cut crop material is picked up by transverse pickup 30 and fed through a harvesting assembly (not shown) into bale-forming chamber 20 where it is formed into a cylindrically shaped bale (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51*a*, 51*b* and the bale is discharged onto the ground.

Figure 2:
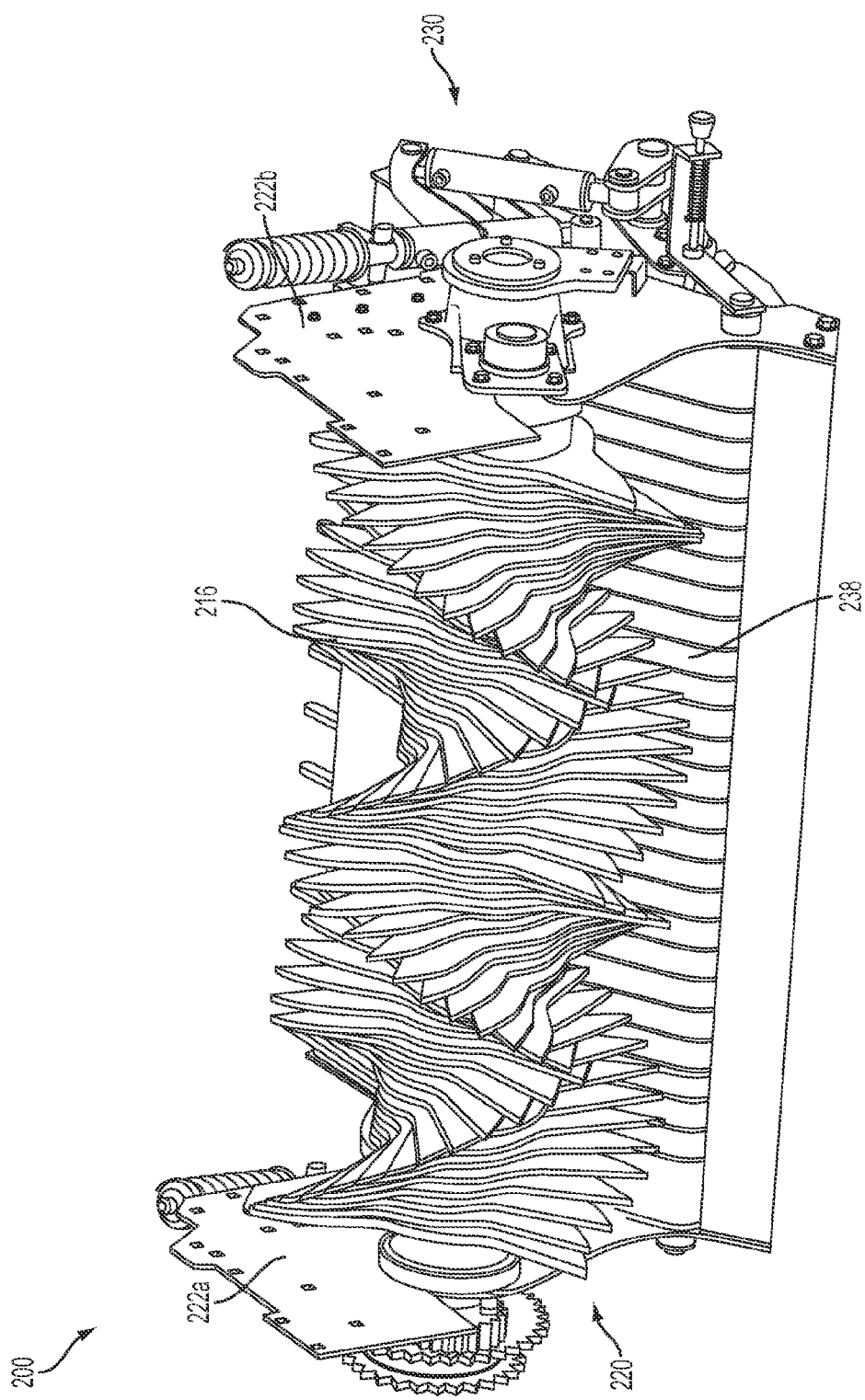
FIG. 2 depicts a harvesting assembly, with a feeder and bottom floor assembly.
Figure 3:
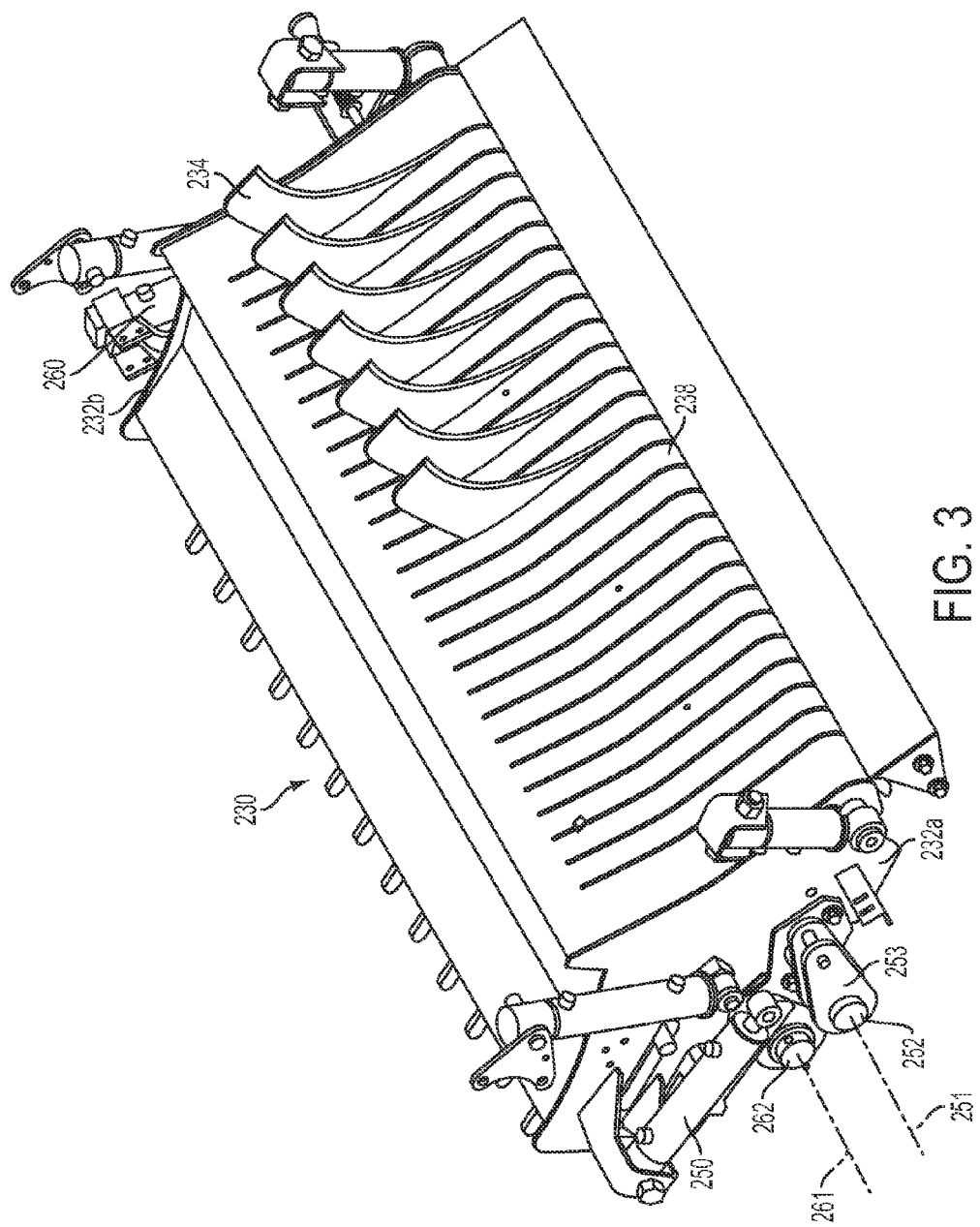
FIG. 3 depicts a bottom floor assembly.

FIGS. 2 and 3 depict an exemplary embodiment of a harvesting assembly with various parts and assemblies shown or removed for clarity. FIG. 2 depicts the harvesting assembly, generally designated 200. A pick-up assembly (not shown) would pick crop material (which would enter from the bottom in this orientation) off of the ground and passes it to a feeder assembly 220, which is defined by a pair of sidewalls 222*a* and 222*b* and a series of rotor blades 216. The rotor blades 216 feed the crop material into a crop collection channel defined as the space between the bottom floor plate 238 of the bottom floor assembly 230 and the rotor of the feeder assembly.

FIG. 3 depicts the harvesting assembly with the feeder assembly removed, showing the bottom floor assembly 230 and some example knives 234. The bottom floor assembly 230 comprises oppositely facing sidewalls 232*a*, 232*b*, upon which a bottom floor plate 238 and two cutting knife trays (not clearly shown) are attached. Also attached to the oppositely facing sidewalls 232*a*, 232*b* are components of the first and second loading systems. For the first loading system, a hydraulic cylinder 250 operates the upper knife tray and a transverse member 252, the axis upon which the transverse member rotates 251, and a co-axial element 253 that can connect the hydraulic cylinder 250 to the transverse member 252. From this angle, less is shown on the second loading system, which operates the lower knife tray, although the part of the hydraulic cylinder 260, and the second loading unit transverse member 262 are depicted. Upon extension of the hydraulic cylinder the transverse axis rotates and causing linear movement of the tray thereby engaging the set of knives. The knife tray may be withdrawn upon the reverse motion driven by collapse of the cylinder.

Figure 4:
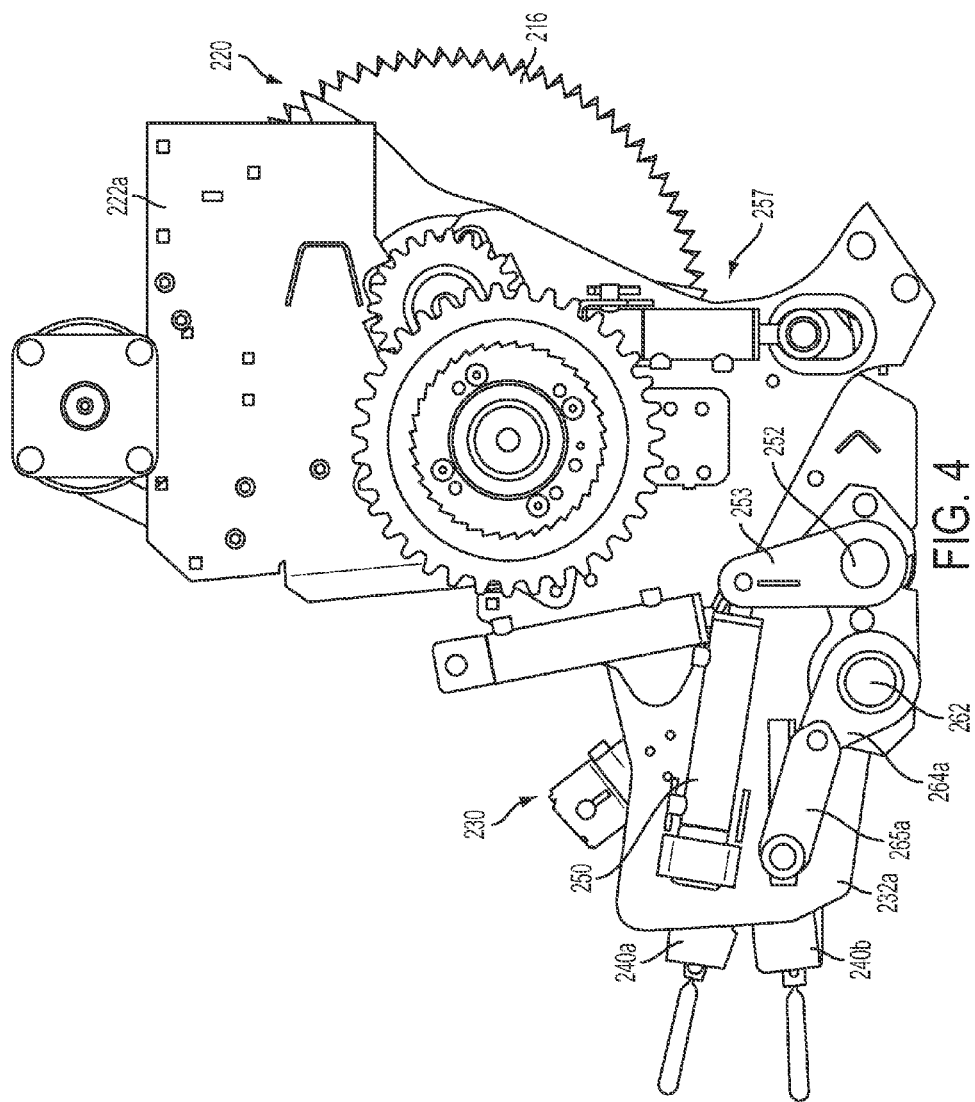
FIG. 4 depicts the harvesting assembly from right-side perspective.
Figure 5:
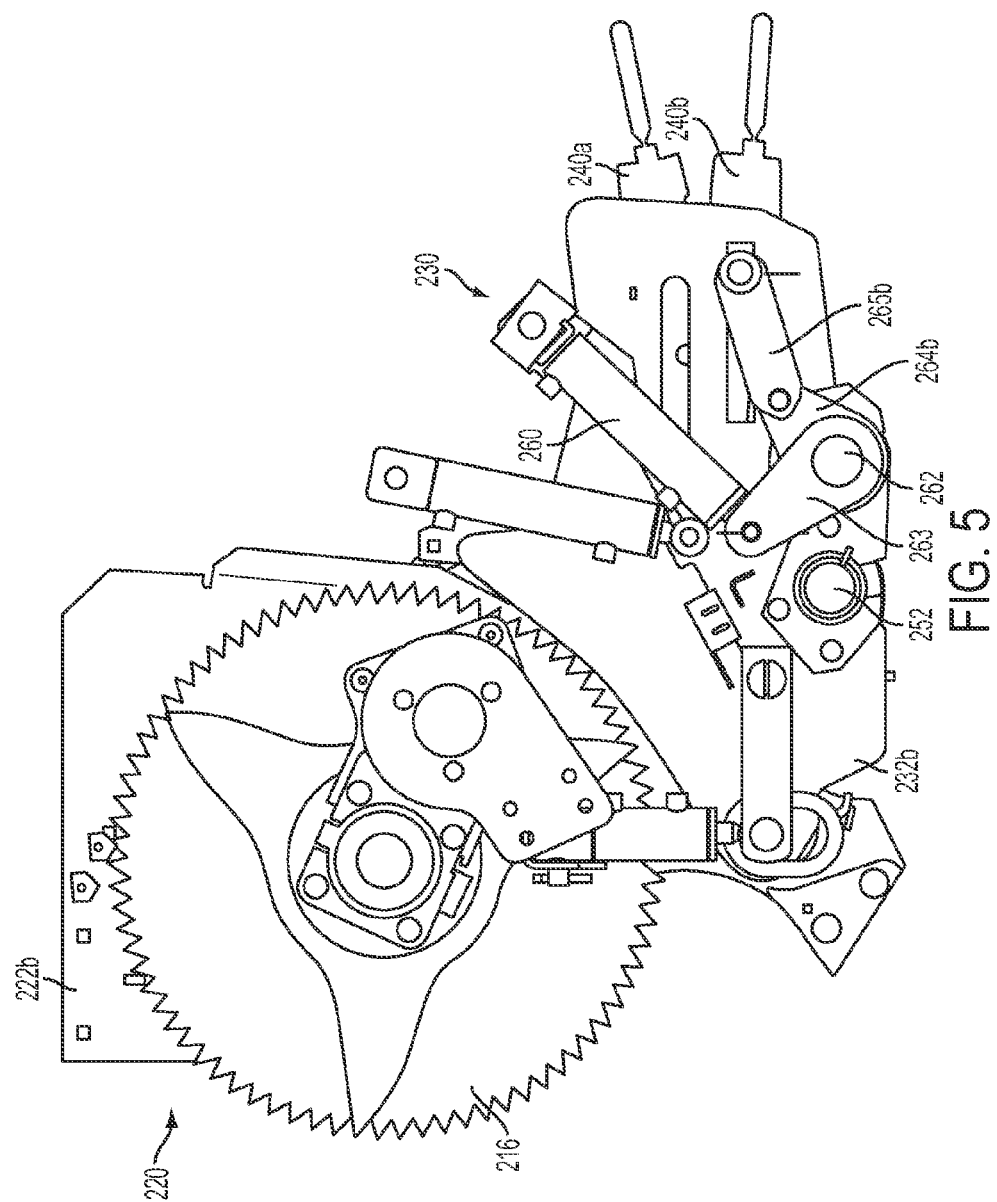
FIG. 5 depicts the harvesting assembly from a left-side perspective.

FIGS. 4 and 5 depict the harvesting assembly and the two loading systems from a right- and left-sided perspective respectively. FIG. 4 depicts the feeder assembly 220 with the right sidewall 222*a* and the rotor blades 216. Crop material would enter the crop collection channel from the inlet 257. The bottom floor assembly 230 is shown with the right sidewall 232*a*. The upper knife tray 240*a* and lower knife tray 240*b* are shown protruding from the rear of the bottom floor assembly 230. Components of the upper tray loading system include the hydraulic cylinder 250, a co-axial element 253, and the transverse member 252. Components of the lower tray loading system include the transverse member 262, a co-axial element 264*a*, and a linking member 265*a*.

FIG. 5 depicts the feeder assembly 220 with the left sidewall 222*b* and the rotor blades 216. The bottom floor assembly 230 is shown with the left sidewall 232*b*. The upper and lower knife trays, 240*a*, 240*b* are shown. Components of the upper tray loading system include the transverse member 252. Components of the lower tray loading system include the hydraulic cylinder 260, a co-axial element 263, the transverse member 262, another co-axial element 264*b*, and a linking member 265*b*

Figure 6:
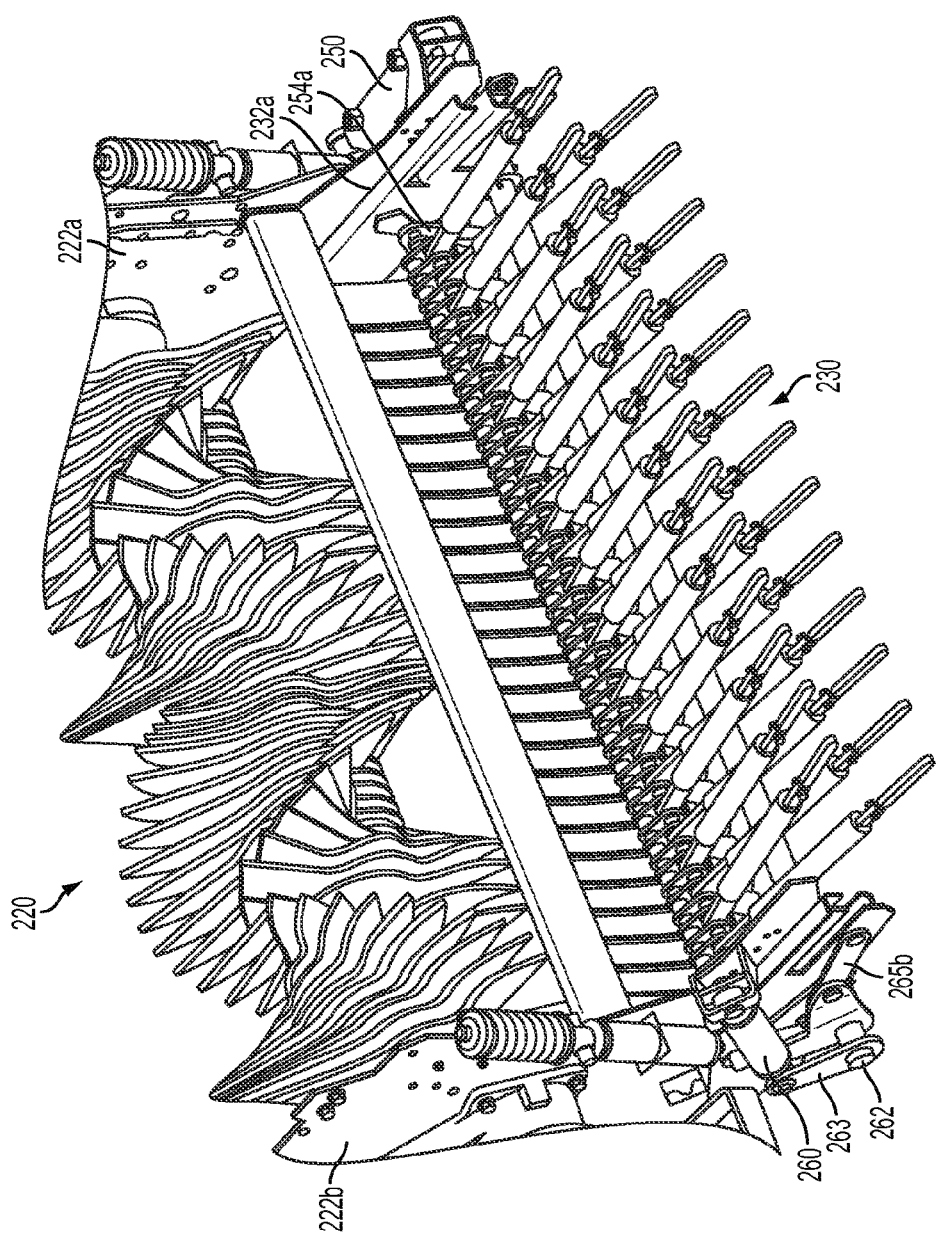
FIG. 6 depicts the harvesting assembly from an upward rear perspective with the upper and lower knife trays removed.

FIG. 6 depicts the bottom floor assembly 230, and loading systems from an upper rear perspective, notably with cross members of both knife trays removed for clarity. Components of the upper tray loading system shown include the hydraulic cylinder 250, and, importantly, a co-axial element 254*a* that is located on the interior side of the right sidewall 232*a*. In some embodiments, the co-axial element 254*a* is connected to the transverse member of the upper tray loading system. In some embodiments, another co-axial element (not shown) is connected to the transverse member of the upper tray loading system and is located on the interior side of the left sidewall. Components of the lower tray loading system shown include the hydraulic cylinder 260, the co-axial element 263, and the linking member 265*b*.

Figure 7:
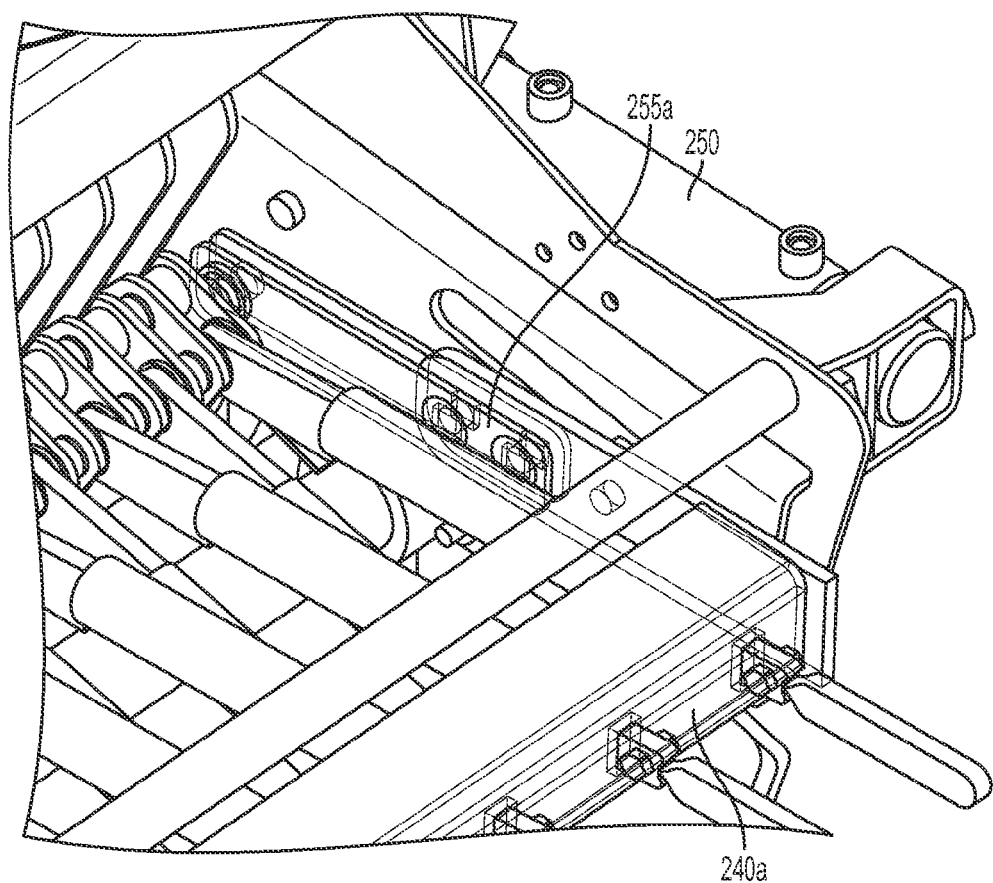
FIG. 7 depicts the upper knife tray loading assembly from an interior perspective.

FIG. 7 is a close-up of the interior side of the right sidewall of the embodiment depicted in FIG. 6. Shown are elements of the upper tray loading system, including the hydraulic cylinder 250, and the linking member 255*a*, which mechanically connects the upper knife tray 240*a* with the co-axial element located on the interior of the right sidewall (not shown here, but 254*a* in FIG. 6). In some embodiments, another linking member (not shown) mechanically connects the upper knife tray 240a with another co-axial element location on the interior of the left sidewall. In some embodiments, rotation of at least one co-axial element causes the linking member 255a and the connected upper knife tray to move inward toward the crop intake (not shown), pushing the upper knife tray into a loaded position and causing the knives of the upper knife tray to deploy into the crop collection channel.

Figure 8:
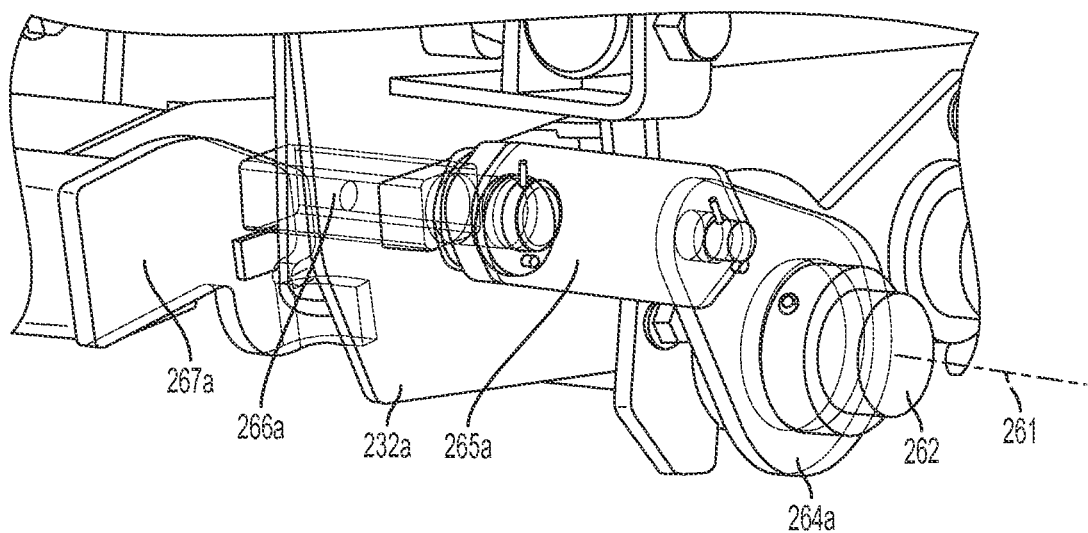
FIG. 8 depicts the bottom knife tray loading assembly from a right-side perspective.

Moving from the description of the upper tray loading system to the lower tray loading system, FIG. 8 depicts a close-up of the exterior side of the right sidewall 232a. Depicted is the axis 261 around which the lower tray loading system transverse member 262 and co-axial element 264a rotates. The linking member 265a mechanically connects the co-axial element 264a with a cam 266a that passes between the right sidewall 232a via a slot. The cam 266a connects with a bracket 267a that holds the cross member of the lower knife tray. In some embodiments, the cam 266a and bracket 267a together are known as a connecting unit. In some embodiments, rotation of the co-axial element 264a causes the cam 266a to be pulled along the slot, such that the bracket 267a and the connected lower knife tray move inward toward the crop intake (not shown), pushing the lower knife tray into a loaded position and causing the knives of the lower knife tray to deploy into the crop collection channel.

Figure 9:
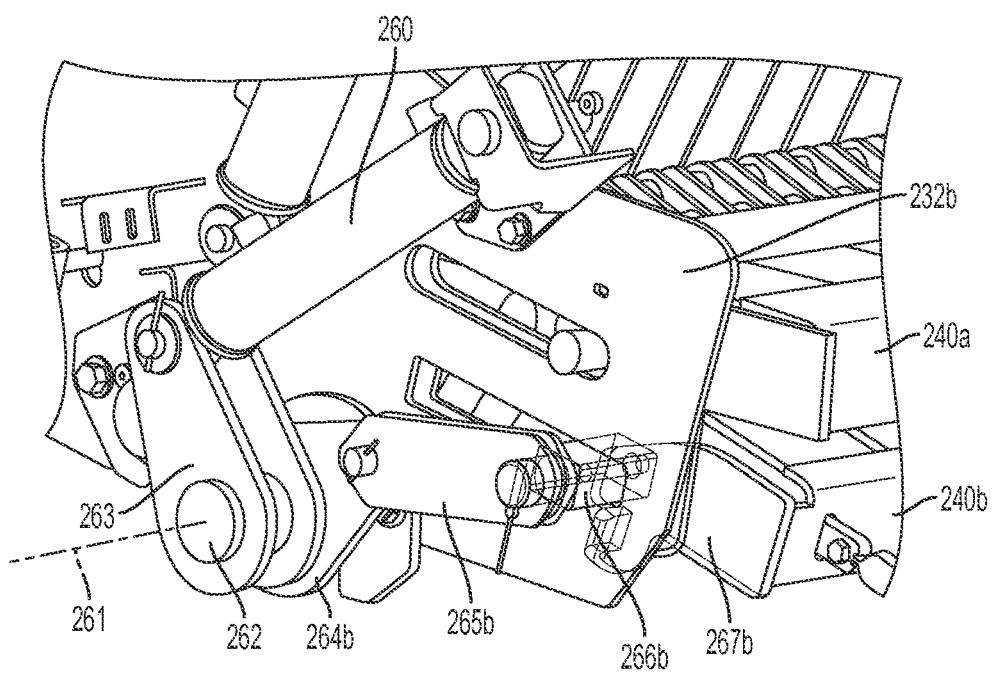
FIG. 9 depicts the bottom knife tray loading assembly from a left-side perspective.

Continuing to focus on the lower tray loading system, FIG. 9 depicts a close-up of the exterior side of the left sidewall 232b in an embodiment. Depicted is the hydraulic cylinder 260, and the axis 261 around which the lower tray loading system transverse member 262 and co-axial members 263 and 264b rotate. The linking member 265b mechanically connects the co-axial element 264b with a cam 266b that passes between the right sidewall 232b via a slot. The cam 266b connects with a bracket 267b that holds the cross member of the lower knife tray 240b. In some embodiments, the cam 266a and bracket 267a together are known as a connecting unit. In some embodiments, rotation of the co-axial element 264b causes the cam 266b to be pulled along the slot, such that the bracket 267b and the connected lower knife tray 240b move inward toward the crop intake (not shown), pushing the lower knife tray 240b into a loaded position and causing the knives of the lower knife tray to deploy into the crop collection channel.

Having described the components of the upper and lower loading systems, the remaining figures depict the various positions of the upper and lower loading systems. Specifically, in some embodiments, both loading systems may work independent of each other, such that none, just one, or both of the knife trays can be in a loaded position at a given time. For each loading system in general, a hydraulic cylinder or other mechanical device is connected to a transverse member, such that extension or retraction of the hydraulic cylinder causes rotation of the transverse member. Extending from the transverse member are a series of mechanical linkages connected to a knife tray that translate the rotational movement of the transverse member to a linear movement, such that as the transverse member rotates, the connected knife tray moves towards or away from the crop collection channel along a linear vector defined by slots in the sidewalls.

Figure 10:
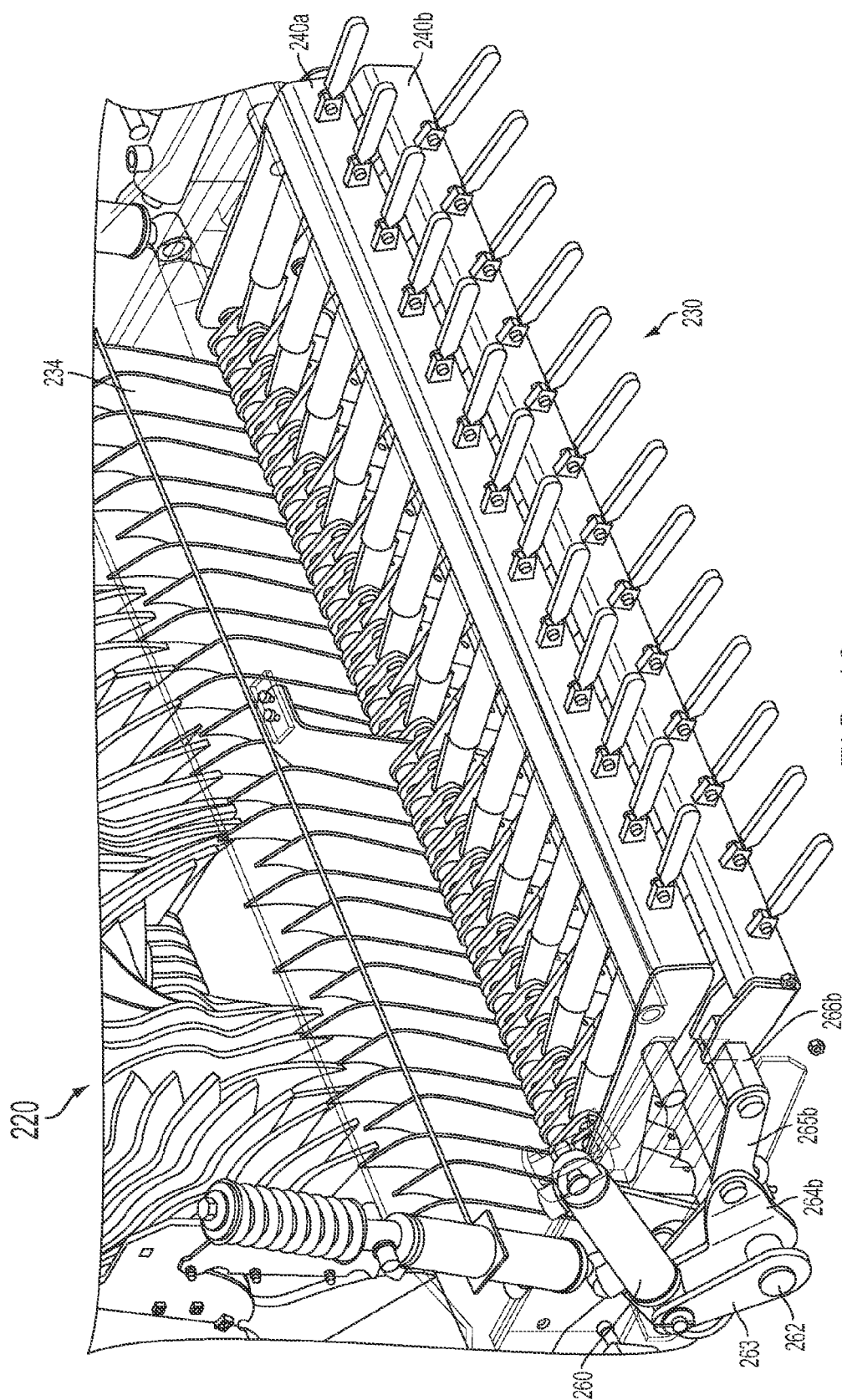
FIG. 10 depicts the harvesting assembly from an upward rear perspective, with both knife trays in unloaded positions.
Figure 11:
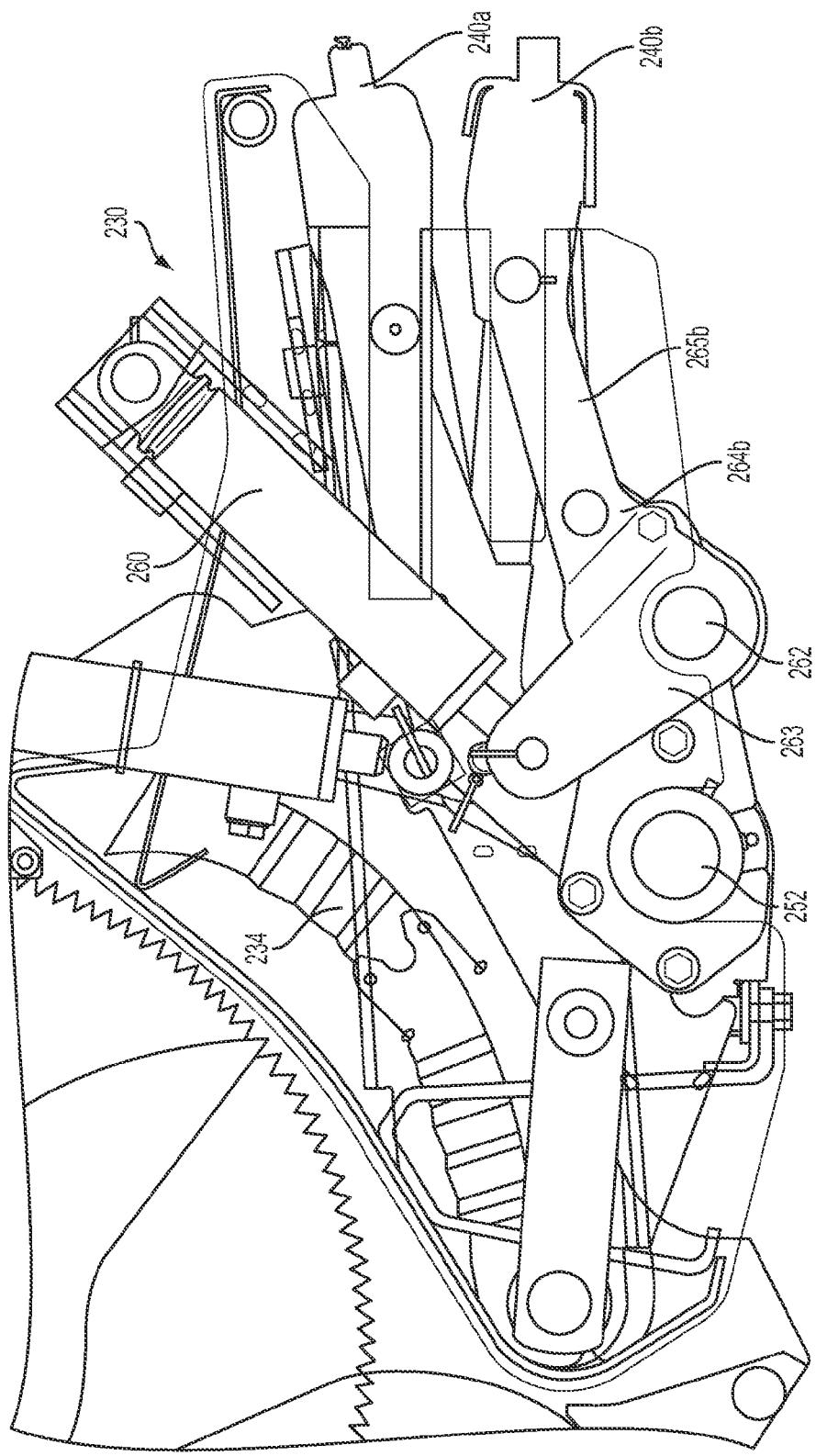
FIG. 11 depicts the harvesting assembly from a left-side perspective, with both knife trays in unloaded positions.

FIGS. 10 and 11 depict the upper and lower loading systems in unloaded positions. For clarity, in these and the remaining figures, the sidewalls of the bottom floor assembly 230 of the embodiments are outlined but otherwise transparent. FIG. 10 shows the bottom floor assembly 230 and the knife trays from an upper rear perspective. Clearly seen are the twenty six individual knife units, one of which 234 is labeled. All twenty six knives are currently not in the crop collection channel, and both knife trays 240a, 240b are located in a position maximally distal from the crop collection channel as the upper and lower loading systems allow. FIG. 11 depicts the bottom floor assembly 230 and the knife trays from a left side perspective. A knife blade 234 is shown in a retracted position, out of the crop collection channel. The hydraulic cylinder of the lower loading system 260 is fully retracted.

Figure 12:
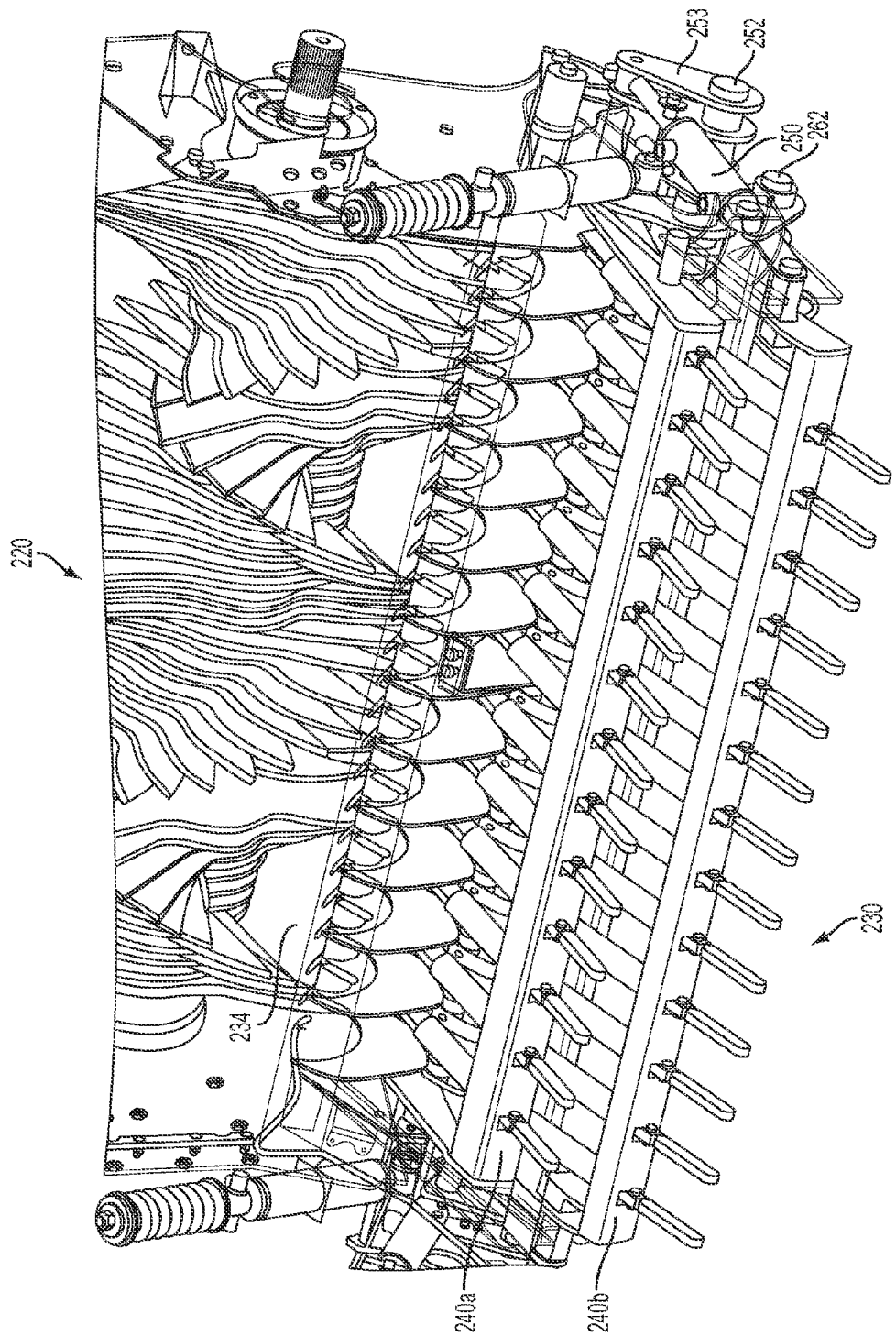
FIG. 12 depicts the harvesting assembly from an upward rear perspective, with the upper knife tray in a loaded position.
Figure 13:
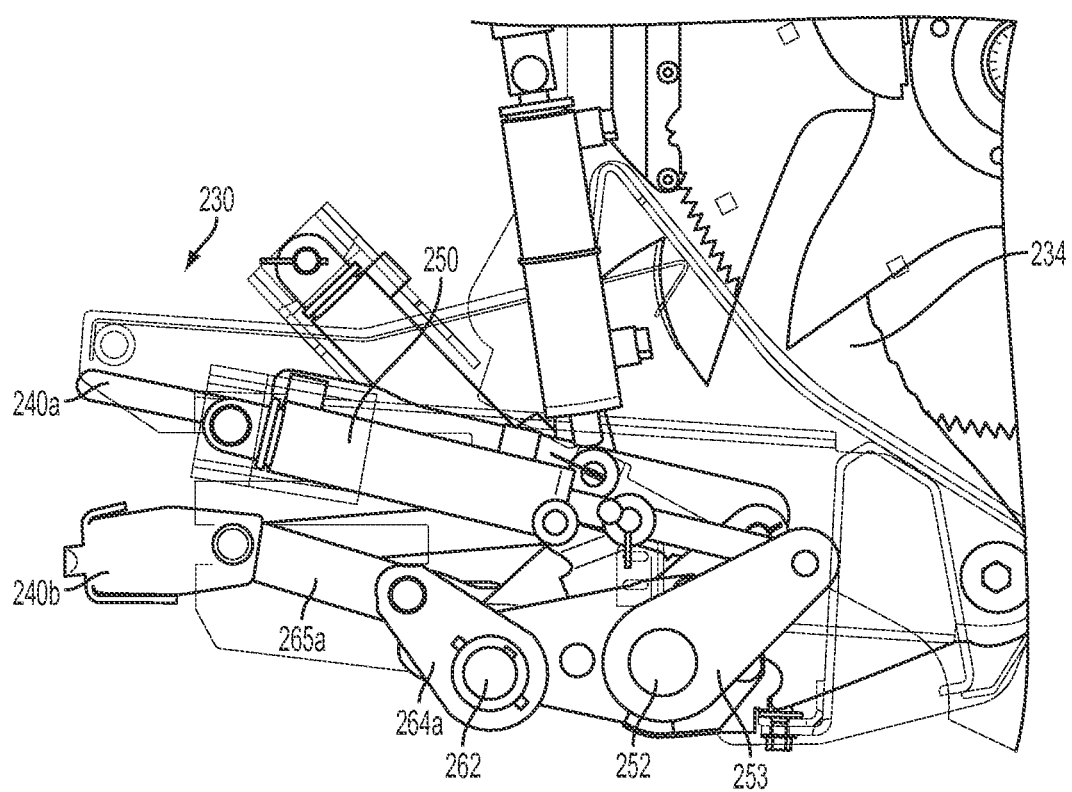
FIG. 13 depicts the harvesting assembly from a right-side perspective, with the upper knife tray in a loaded position.

FIGS. 12 and 13 depict the upper loading system in a loaded position and the lower loading system in an unloaded position. FIG. 12 depicts the bottom floor assembly 230 and the knife trays from an upper rear perspective. Thirteen knife units, one of which 234 is labeled, are loaded into the crop collection channel, and are associated with the upper knife tray 240a, while the remaining thirteen knife units of the lower knife tray 240b are still unloaded. The hydraulic cylinder of the upper loading system 250 is extended, causing the co-axial element 253 to rotate around the transverse member 252, further causing linking members (not clearly shown) to pull the upper knife tray 240a in towards the crop collection channel. This is seen more clearly in FIG. 13, which depicts the bottom floor assembly 230 and the knife trays from a right side perspective. The loaded knives of the upper knife tray 240a are seen in the crop collection channel. The hydraulic cylinder of the upper knife tray 250 is extended, pushing the co-axial element 253 and transverse member 252 clockwise around the transverse axis (not shown, but positioned at the center of the transverse member 252). The upper knife tray 240a is pulled further in compared to the lower knife tray 240b, and this linear movement causes the knives associated with the upper knife tray 240a to load and enter into the crop collection channel.

Figure 14:
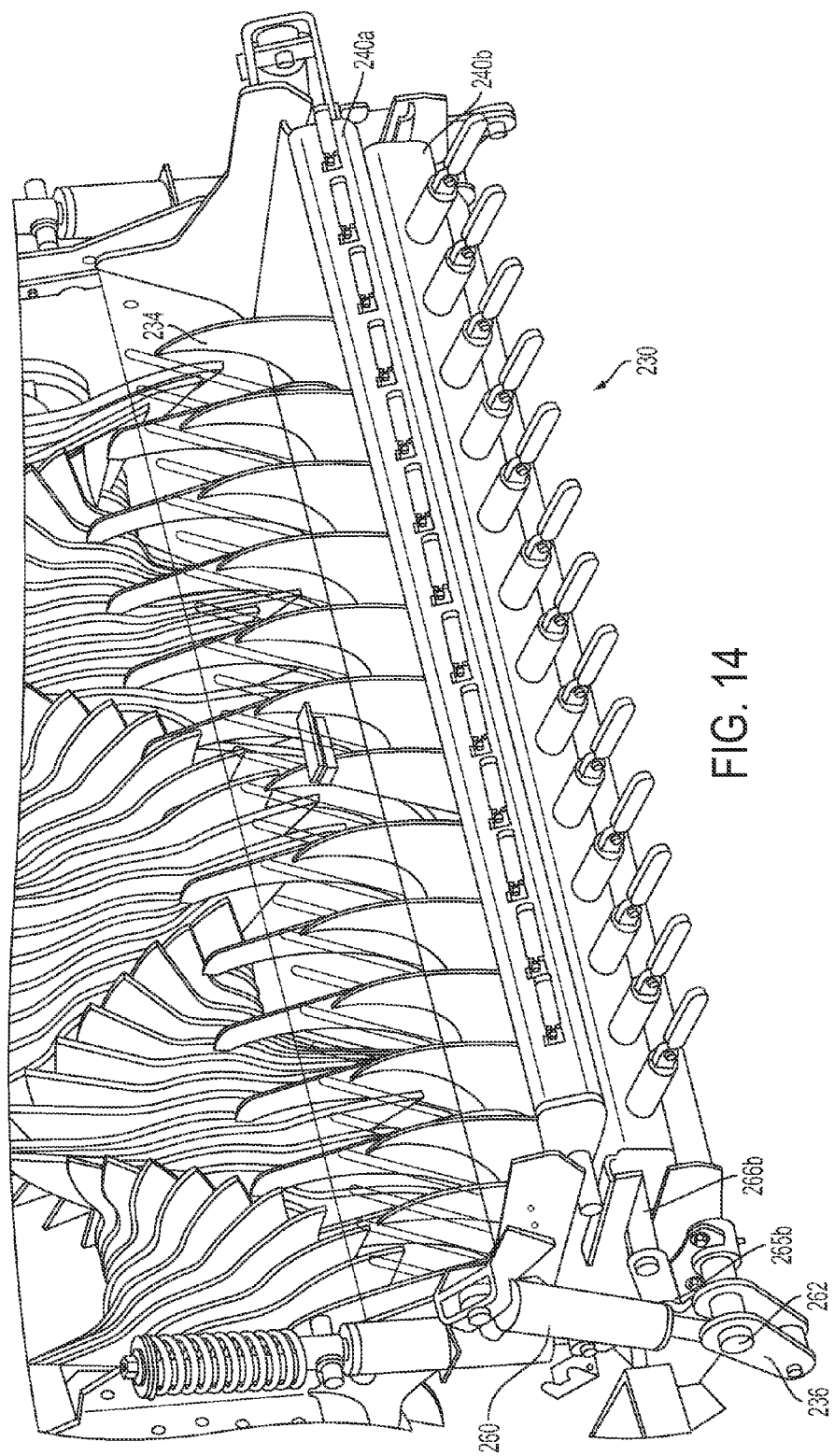
FIG. 14 depicts the harvesting assembly from an upward rear perspective, with the lower knife tray in a loaded position.
Figure 15:
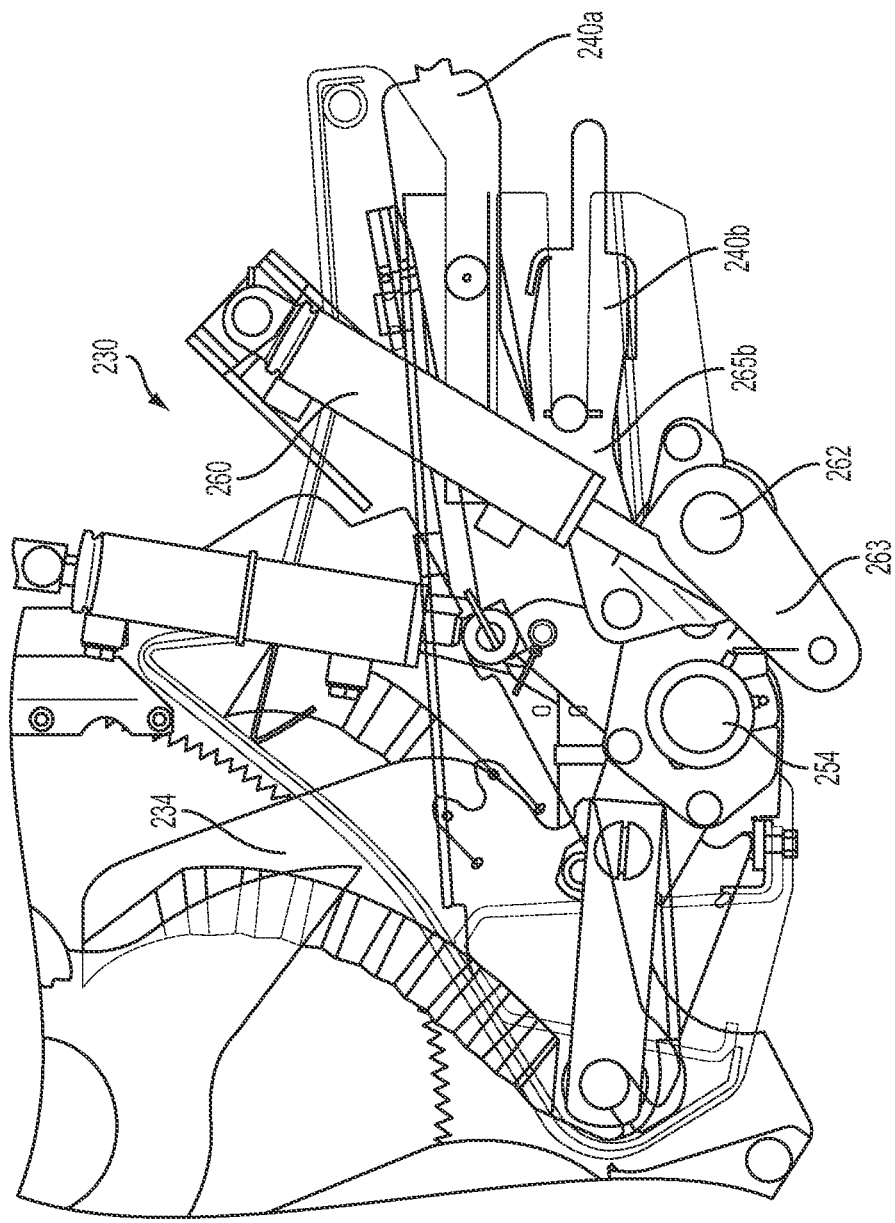
FIG. 15 depicts the harvesting assembly from a left-side perspective, with the lower knife tray in a loaded position.

FIGS. 14 and 15 depict the lower loading system in a loaded position and the upper loading system in an unloaded position. FIG. 14 depicts the bottom floor assembly 230 and the knife trays from an upper rear perspective. Thirteen knife units, one of which 234 is labeled, are loaded into the crop collection channel, and are associated with the lower knife tray 240b, while the remaining thirteen knife units of the upper knife tray 240a are unloaded. The hydraulic cylinder of the lower loading system 260 is extended, causing the co-axial element 263 to rotate around the transverse member 262, further causing linking member 265b to pull the lower knife tray 240b in towards the crop collection channel. This is seen more clearly in FIG. 15, which depicts the bottom floor assembly 230 and the knife trays from a left side perspective. The loaded knives of the lower knife tray 240b are seen in the crop collection channel. The hydraulic cylinder of the lower knife tray 260 is extended, pushing the co-axial element 263 and transverse member 262 counterclockwise around the transverse axis (not shown, but in the center of the transverse member 262). The lower knife tray 240b is pulled further in compared to the upper knife tray 240a, and this linear movement causes the knives associated with the lower knife tray 240b to load and enter into the crop collection channel.

Figure 16:
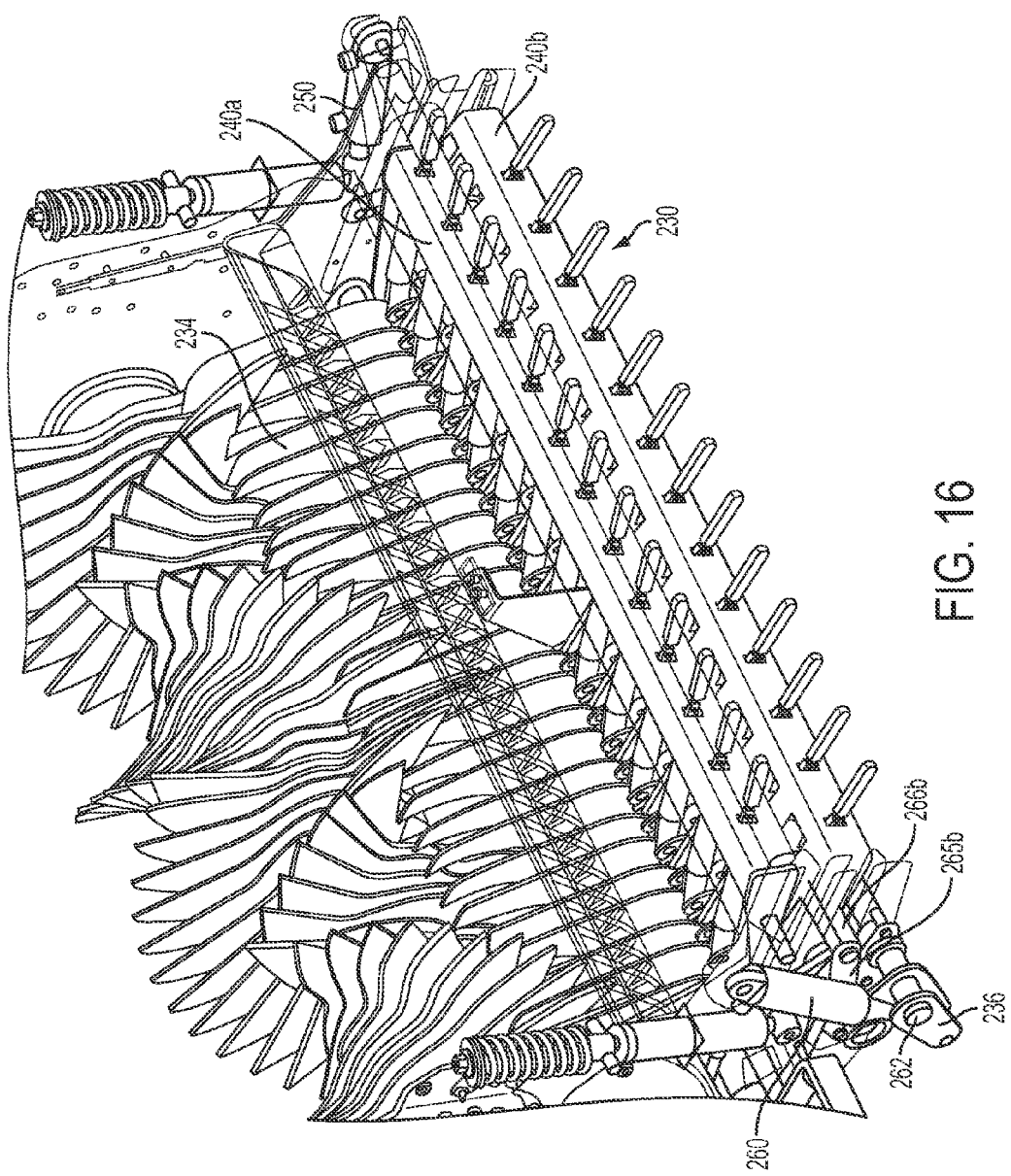
FIG. 16 depicts the harvesting assembly from an upward rear perspective, with both knife trays in loaded positions.
Figure 17:
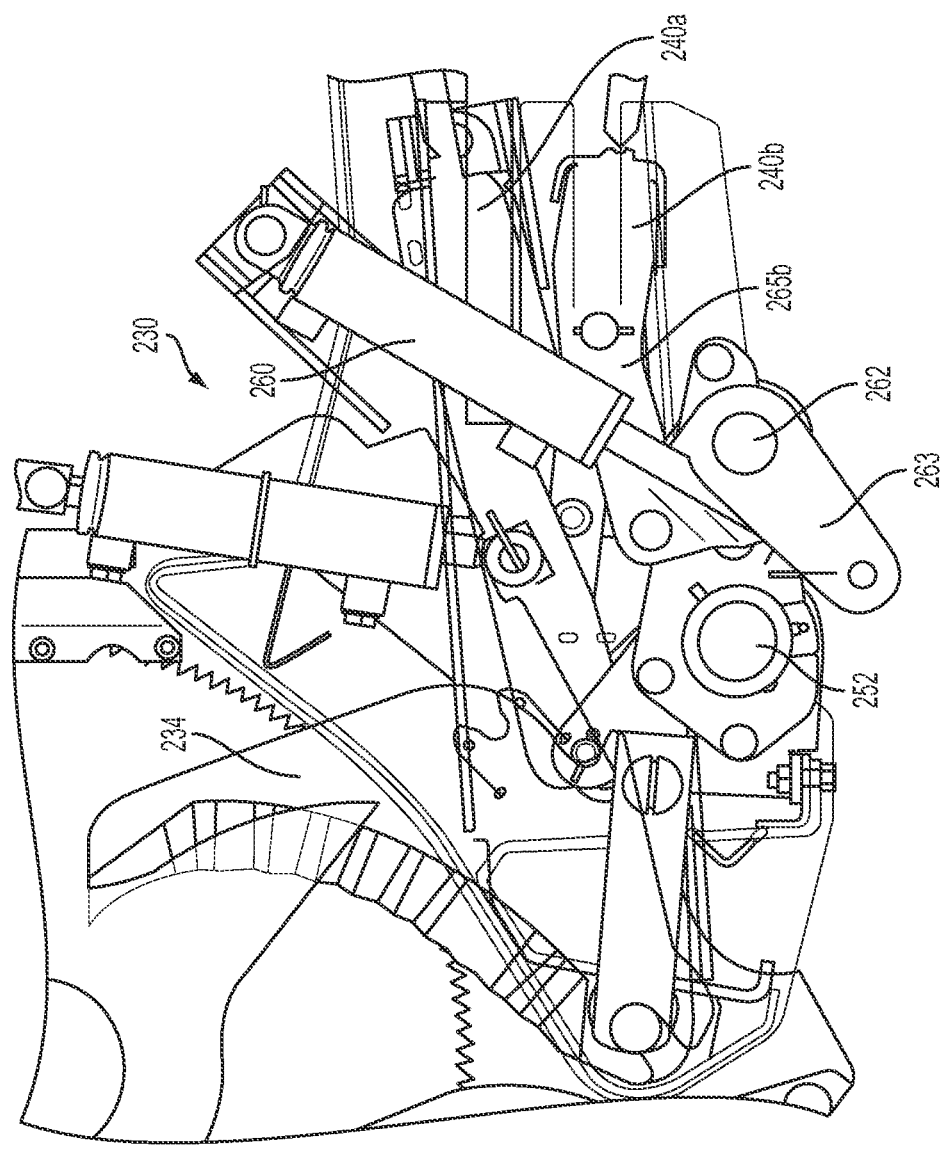
FIG. 17 depicts the harvesting assembly from a left-side perspective, with both knife trays in loaded positions.

Lastly, FIGS. 16 and 17 depict both the upper and lower loading systems in loaded positions. FIG. 16 depicts the bottom floor assembly 230 and the knife trays from an upper rear perspective. All twenty six knife units, one of which 234 is labeled, are loaded into the crop collection channel. The knife units are alternatively associated with one of the loading systems, and, with all twenty-six knife units loaded, the distance between each knife blade is shorter than when only one set of thirteen knives are loaded into the crop collection channel. In this way, the operator of the cutting assembly may decide the cut length of the crop before or during operation of the harvester. Before or during operation of the harvester, the operator may select to increase the cut length of the crop fragments it collects by engaging only one knife tray. Alternatively, the operator may choose to decrease the cut length of crop fragments being harvested, and engage both knife trays. The hydraulic cylinders of both the upper and lower loading systems, 250 and 260 respectively, are extended, causing both the upper knife tray 240a and the lower knife tray 240b to be pulled in towards the crop collection channel. This is seen more clearly in FIG. 17, which depicts the bottom floor assembly 230 and the knife trays from a left side perspective. Both the upper knife tray 240a and the lower knife tray 240b are pulled in closer to the crop collection channel, causing all of the knife blades 234 to extend into the crop collection channel.

In some embodiments, the knife blades of all twenty six knife units are attached to a common forward shaft, such that, upon activation of one or both loading systems, the knife blades associated with the activated loading system or systems pivot around the common forward shaft and enter into the crop collection channel. In some embodiments, the upper knife tray and the lower knife tray are positioned close to each other in vertical space, and the knife blades of all twenty six knife units are attached to a common forward shaft, such that the forces exerted on the knife blades of both the upper knife tray and the lower knife tray are equal or substantially equal.

In some embodiments, the harvester and systems disclosed herein comprise a controller that operates and is in electronic communication with one or more valves and sensors that regulate fluid flow and pressure in a hydraulic circuit. In some embodiments, the hydraulic circuit is in fluid communication with the hydraulic cylinders of the upper and lower loading systems. In some embodiments, the hydraulic circuit is configured to adjust the position of the hydraulic cylinders, such that the associated knife tray moves between an unloaded and a loaded position. In some embodiments, the hydraulic cylinders may be selectively extended synchronously such that the upper and bottom knife tray are engaged in the loaded position simultaneously or substantially simultaneously.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein in its entirety.

What is claimed is:

1. A cutting device comprising:
    first and second oppositely facing sidewalls, wherein at least one of the oppositely facing sidewalls comprises at least a first slot; and
    at least a first loading system comprising:
        at least a first tray, positioned between the two oppositely facing sidewalls and movable to at least a first and a second position, the at least first tray comprising one or a plurality of knives and at least one cross member through which or upon the one or a plurality of knives rest; and
        at least a first transverse member, positioned between and extending through the two oppositely facing sidewalls, rotatable around a first linear axis transverse to the sidewalls and operably linked to at least a first connecting unit positioned at least partially within the at least first slot and mechanically linked to the at least first tray such that rotation of the first transverse member causes linear movement of the at least first tray; such that the at least first tray moves from the at least first position to the at least second position;
        wherein the first position of the at least first tray is an unloaded position and the second position of the at least first tray is a loaded position.

2. The cutting device of claim 1, wherein the at least first connecting unit comprises:
    at least a first bracket mechanically linked to the at least one cross member of the at least first tray; and
    a cam fastened to the at least first bracket, positioned at least partially within the at least first slot, and operably linked to the at least first transverse member.

3. The cutting device of claim 1 further comprising:
    at least a second slot in at least one of the two oppositely facing sidewalls; and
    a second loading system comprising:
        at least a second tray, positioned between the two oppositely facing sidewalls and movable to at least a first and a second position, the at least second tray comprising at least one cross member through which or upon one or a plurality of knives rest; and
        at least a second transverse member, positioned between and extending through the two oppositely facing sidewalls, rotatable around a second linear axis transverse to the sidewalls and operably linked to at least a second connecting unit positioned at least partially within the second slot and mechanically linked to the at least second tray such that rotation of the at least second transverse member causes linear movement of the at least second tray; such that the at least second tray moves from the at least first position to the at least second position;
        wherein the first position of the at least second tray is an unloaded position and the second position of the at least second tray is a loaded position.

4. The cutting device of claim 3, wherein the at least second connecting unit comprises:
    at least a first bracket mechanically linked to the at least one cross member of the at least second tray and mechanically linked to the second transverse member; and
    a cam fastened to the bracket, positioned at least partially with the at least second slot.

5. The cutting device of claim 3, wherein the first and second loading systems are independently moveable, such that the cutting device operates when both the first and second loading systems are in an unloaded positions, when the first loading system is in a loaded position while the second loading system is in an unloaded position, when the second loading system is in a loaded position while the first loading system is in an unloaded position, or when the first and second loading system are both in a loaded position.

6. The cutting device of claim 1, wherein the at least first transverse member is operably linked to a lever, hydraulic cylinder, or movable device capable of driving rotation of the at least first transverse member around the first linear axis.

7. The cutting device of claim 1, wherein the at least first transverse member is operably linked to a first hydraulic cylinder by at least a first non-coaxial element that is capable of rotation around and extends radially from the first linear axis, such that extension or contraction of the first hydraulic cylinder causes rotational movement of the at least first non-coaxial element and the at least first transverse member around the first linear axis.

8. The cutting device of claim 7, wherein the at least first transverse member is mechanically linked to a second non-coaxial element that is capable of rotation around and extends radially from the first linear axis, such that rotation of the at least first transverse member causes rotation of the second non-coaxial element; and wherein the second non-coaxial element is operably connected to the at least first connecting unit by at least a first linking member.

9. The cutting device of claim 8, wherein the extension or contraction of the first hydraulic cylinder causes movement of the at least first connecting unit, the at least first linking member, the at least second non-coaxial element, the at least first transverse member, and the at least first non-coaxial element by the first hydraulic cylinder, allowing the at least first tray to move between the at least first and second positions.

10. The cutting device of claim 8, wherein the at least first transverse member is mechanically linked to a third non-coaxial element that is capable of rotation around and extends transversely from the first linear axis, such that rotation of the at least first transverse member causes rotation of the third non-coaxial element; wherein the third non-coaxial element is operably connected to at least a third connecting unit by at least a second linking member.

11. The cutting device of claim 10, wherein the first hydraulic cylinder, the at least first non-coaxial element, the at least second non-coaxial element and the at least first linking member are positioned on the exterior surface of one of the two oppositely facing sidewalls and the at least third non-coaxial element and the at least second linking member are positioned on the exterior surface of the other oppositely facing sidewall.

12. The cutting device of claim 1, wherein the first loading system is configured for loading knives within a crop channel between a rotary cutter and a drop floor unit.

13. The cutting device of claim 3, wherein the at least second transverse member is operably linked to a lever, hydraulic cylinder, or movable device capable of driving rotation of the at least second transverse member around the second linear axis.

14. The cutting device of claim 3, wherein the at least second transverse member is operably linked to a second hydraulic cylinder by at least a fourth non-coaxial element that is capable of rotation around and extends transversely from the second linear axis, such that extension or contraction of the second hydraulic cylinder causes rotational movement of the at least fourth non-coaxial element and the at least second transverse member around the second linear axis.

15. The cutting device of claim 14, wherein the at least second transverse member is mechanically linked to a fifth non-coaxial element that is capable of rotation around and extends transversely from the second linear axis, such that rotation of the at least second transverse member causes rotation of the fifth non-coaxial element; and wherein the fifth non-coaxial element is operably connected to the at least third connecting unit by at least a third linking member.

16. The cutting device of claim 15, wherein the extension or contraction of the second hydraulic cylinder causes movement of the at least third connecting unit, the at least third linking member, the at least fifth non-coaxial element, the at least second transverse member, and the at least fourth non-coaxial element, allowing the at least second tray to move between the at least first and second positions.

17. The cutting device of claim 15, wherein the at least second transverse member is mechanically linked to a sixth non-coaxial element that is capable of rotation around and extends transversely from the second linear axis, such that rotation of the at least second transverse member causes rotation of the sixth non-coaxial element; wherein the sixth non-coaxial element is operably connected to at least a fourth connecting unit by at least a fourth linking member.

18. The cutting device of claim 17, wherein the second hydraulic cylinder and the at least fourth non-coaxial element are positioned on the exterior surface of one of the two oppositely facing sidewalls; wherein the fifth non-coaxial element and the third linking member are positioned on the interior surface of the same sidewall; and wherein the sixth non-coaxial element and the fourth linking member are positioned on the interior surface of the other oppositely facing sidewall.

19. The cutting device of claim 5, wherein the first and second loading systems are configured for loading knives within a crop channel between a rotary cutter and a drop floor unit, such that, in a loaded position, the knives of the first loading system do not interfere with the knives of the second loading system.

20. The cutting device of claim 19, wherein the knives of the first loading system comprise a plurality of arrangements within the at least first tray and the knives of the second loading system comprise a plurality of arrangements with the at least second tray; wherein the plurality of arrangements for each tray comprises an amount of knives from about zero to about thirteen; and wherein the total number of knives comprises an amount of knives from about zero to about twenty-six.

21. A harvester comprising a cutting device comprising:
first and second sidewalls, wherein at least one of the first and second sidewalls comprises at least a first slot; and
at least a first loading system comprising:
at least a first tray, positioned between the first and second sidewalls and movable to at least a first and a second position, the at least first tray comprising one or a plurality of knives and at least one cross member through which or upon the one or a plurality of knives rest; and
at least a first transverse member, positioned between and extending through the first and second sidewalls, rotatable around a first linear axis transverse to the first and second sidewalls and operably linked to at least a first connecting unit positioned at least partially within the at least first slot and mechanically linked to the at least first tray such that rotation of the first transverse member causes linear movement of the at least first tray; such that the at least first tray moves from the at least first position to the at least second position;
wherein the first position of the at least first tray is an unloaded position and the second position of the at least first tray is a loaded position.

22. The harvester of claim 21, further comprising:
at least a second slot in at least one of the first and second sidewalls; and
a second loading system comprising:
at least a second tray, positioned between the first and second sidewalls and movable in at least a first and a second position, the at least second tray comprising at least one cross member through which or upon one or a plurality of knives rest; and at least a second transverse member, positioned between and extending through the first and second sidewalls, rotatable around a second linear axis transverse to the first and second sidewalls and operably linked to at least a second connecting unit positioned at least partially within the second slot and mechanically linked to the at least second tray such that rotation of the at least second transverse member causes linear movement of the at least second tray; such that the at least second tray moves from the at least first position to the at least second position;

wherein the first position of the at least second tray is an unloaded position and the second position of the at least second tray is a loaded position.

23. The harvester of claim 22, wherein the first and second loading systems are independently moveable, such that the cutting device operates when both the first and second loading systems are in an unloaded positions, when the first loading system is in a loaded position while the second loading system is in an unloaded position, when the second loading system is in a loaded position while the first loading system is in an unloaded position, or when the first and second loading system are both in a loaded position.

24. The harvester of claim 23, wherein the first and second loading systems are configured for loading knives within a crop channel between a rotary cutter and a drop floor unit, such that, in a loaded position, the knives of the first loading system do not interfere with the knives of the second loading system.

25. The harvester of claim 24, wherein the knives of the first loading system comprise a plurality of arrangements within the at least first tray and the knives of the second loading system comprise a plurality of arrangements with the at least second tray; wherein the plurality of arrangements for each tray comprises an amount of knives from about zero to about thirteen; and wherein the total number of knives comprises an amount of knives from about zero to about twenty-six.

26. A method of moving one or a plurality of knives within a crop channel of a harvester, comprising:
a) extension of at least one hydraulic cylinder connected to at least one transverse member;
b) rotation of the at least one transverse member positioned between a first and a second sidewall;
c) movement of at least one connecting unit along at least one slot in at least one of the first and second sidewalls, said movement in the direction towards the crop channel, wherein the transverse member is rotatable around an axis and operably linked to the at least one connecting unit;
d) movement of at least one tray comprising one or a plurality of knives toward the crop channel, the at least one connecting unit mechanically linked to the at least one tray such that rotation of the at least one transverse member causes the movement of the at least one tray such that the at least one tray moves from the first position to the second position, wherein the first position of the at least one tray is an unloaded position and the second position of the at least one tray is a loaded position; and
e) entry of the one or a plurality of knives within the crop channel.

* * * * *